July 26, 1927.

E. H. McKINNEY

HYDRAULIC CLUTCH TRANSMISSION

Filed Dec. 18, 1924

1,636,700

INVENTOR
Edward H. McKinney
BY
ATTORNEY

Patented July 26, 1927.

1,636,700

UNITED STATES PATENT OFFICE.

EDWARD H. McKINNEY, OF SALINA, KANSAS, ASSIGNOR TO THE HYDRAULIC SPECIALTY MANUFACTURING COMPANY, OF TOPEKA, KANSAS, A CORPORATION.

HYDRAULIC CLUTCH TRANSMISSION.

Application filed December 18, 1924. Serial No. 756,701.

This invention relates to a variable speed hydraulic clutch transmission, the primary object being to provide a clutch with a body of fluid interposed between the driving member and the driven member with a passageway or passageways through which the fluid may flow, the passageway or passageways being provided with means whereby their effective port areas may be varied so that in one extreme the driving element may rotate independently of the driven element and whereby in another extreme the driving and the driven elements will move in unison.

The illustrated embodiment of the invention comprises a rotor on the driving element and a stator on the driven element. When the clutch is not functioning as a driving means between the driving and driven shafts, under certain conditions the rotor may pick up the stator so that the rotor will move at a greater speed ratio than the stator while it is driving it, and whereby under extreme conditions the speeds are both the same.

Figure 1:
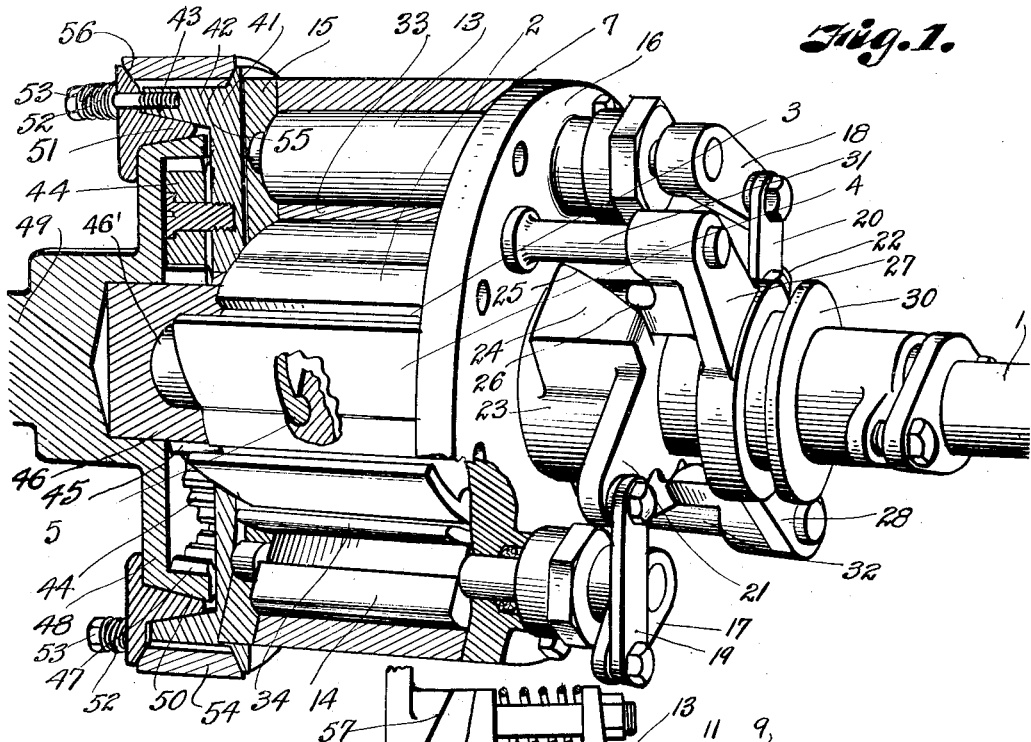
Figure 2:
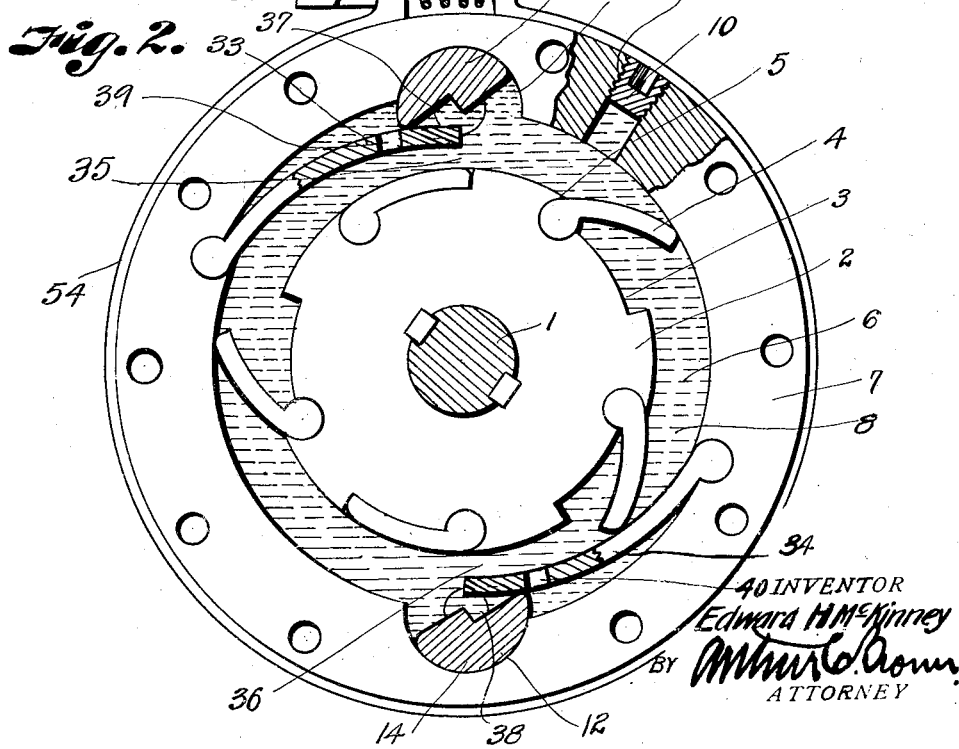

The novelty of the invention will be specifically described hereinafter, reference being had to the accompanying drawings, in which Fig. 1 is a view partly in section and partly in perspective of a hydraulic power transmitting clutch constructed in accordance with my invention, and Fig. 2 is an end view with one of the end cover plates removed, the wall of the casing, part of one of the valves and the valve actuators being shown in section.

Referring now to the drawings by numerals of reference, 1 designates a driving shaft, for example the driving shaft of a motor vehicle; 2 is a rotor on the driving shaft. It consists of a substantially cylindrical head provided with recesses 3 and for each recess there is provided a wing 4 hinged to the head at 5. The wings are curved on arcs conforming to the curvature of the head so that when they are in their recesses the head will have an unbroken cylindrical surface but when they are forced out by centrifugal action they will serve as impellers for a body of fluid 6 in the casing 7 in which the rotor 2 is located. By referring to the drawings it will be observed that the member 2 has a diameter less than the diameter of casing 7 to provide a fluid space 8 for the liquid 6. The liquid 6 is admitted into the space through an opening 9 to be closed at 10, and for the purpose of this invention it is important that the liquid completely fill the space 8. In the recesses 11 and 12 in the wall of the casing 7 are longitudinally disposed valve actuators 13 and 14 which are mounted in bearings in the respective ends 15 and 16 of the casing so that the valve actuators may be rocked by the cranks 17 and 18 on the ends of the members 13 and 14. The cranks are moved by links 19 and 20 which are connected to the arms 21 and 22 on the collar 23 mounted about the axis of the drive shaft 1, and consequently with the casing 7. Means must be provided of course for rocking the collar 23 so I have provided two cams, one of which is shown in Fig. 1 and designated at 24, there being a like cam diametrically opposite on the collar 23. Each cam is provided with an angular face 25 on which may ride a lug or projection 26, one carried by each arm 27 and 28 on the longitudinal movable collar 30 also mounted about the axis of the shaft 1. The arms 27 and 28 are guided longitudinally by the pins 31 and 32 so that when the collar 30 is moved longitudinally the projections 26 will ride on the inclined faces 25 and turn the actuators 13 and 14 to cause them to bear against the valve members 33 and 34. When the collar 30 is moved longitudinally of the shaft 1 toward the casing the lugs 26 will ride on the cam faces of the cams or projections 24 to rock the actuators 13 and 14 thereby moving the free ends of the valve wings 33 and 34 toward the head 2, thereby constricting the passageway or space 8 adjacent to the head and since the wings 4 constitute impellers for forcing the fluid rotatively about the axis of the head 2 and the axis of the casing 7 the head may rotate faster than the casing but inasmuch as the lower ratio of rotation or flow will be involved, it will be apparent that the velocity of the fluid passing through the constricted port areas 35 and 36 will create sufficient friction against the valve members 33 and 34 to cause the casing to rotate but the casing will lag or rotate at a reduced speed. If the actuators 13 and 14 are turned so that the wings 33 and 34 bear against the head 2 then there can be no passage of fluid past them, consequently casing 7 will be rotated at the same speed as shaft 1. By turning the actuators 13 and 14 the fluid friction may be varied whereby the rate of rotation of the casing 7 relative to shaft 1 may be varied to any ratio between the two extremes. If the collar 30 is moved away from the casing 7 far enough the pressure of the liquid in space 8 will move the wings 33 and 34 into the recesses 37 and 38 of the actuators and turn the actuators enough to allow the wings 33 and 34 to lie flush against the inner wall of the casing, at which time the rotor will rotate without imparting any movement to casing 7. In order to permit the wings 33 and 34 to recede against the inner face of casing 7, I provide relief ports 39 and 40. On the end of the casing 7 is a recess member 41 having a flange 42 with an inclined face 43. The member 41 carries a circular train of gears 44 which mesh with a central gear 45 which has a hub 46 and is thereby mounted and secured to the protruding end 46' of the shaft 1. These gears also mesh with the internal gear 47 carried by the socket member 48 on the shaft 49, the socket member being mounted on the hub 46. The outside wall 50 of the socket member is spaced from the inclined face 43 of flange 42. A wedge ring 51 is interposed between the two members and it is normally urged into wedging position by the springs 52 on bolts 53 so that when member 7 is rotating the socket, and consequently the shaft 49, will rotate with it at the same speed. There is an expansion ring 54 however between the inclined flanges 55 and 56, one on the member 41 and the other on the wedge ring. When the expanding band is contracted by the actuators 57 the wedge ring will be moved away from functional contact with the socket member then the socket member will be rotated in opposite direction, consequently the shaft member 49 will be in reverse.

It will be seen from the foregoing that the driving member may be rotated without rotating the driven member, that the driven member may be rotated at the same speed as the driving member in the same direction or it may be rotated at an intermediate speed in the same direction or if desired it may be rotated in reverse direction. This makes it especially desirable as a clutch between the driving member and the shaft of a motor vehicle but I wish it to be understood that I am not to be limited to any particular use as the invention is obviously applicable wherever there is to be a difference in speed between the driving member and the driven member.

What I claim and desire to secure by Letters-Patent is:

A device of the character described comprising a cylinder having a liquid space, an impeller in the cylinder in spaced relation with the walls thereof and movable in the liquid space, inwardly swinging wings carried by the cylinder, and actuators for the wings comprising means for swinging said wings into any desired position comprising rotatable camming members having wing-receiving recesses therein.

In testimony whereof I affix my signature.

EDWARD H. McKINNEY.